Jan. 30, 1968 J. P. DRIVER 3,366,880

TONE CONTROLLED WIRELESS TELEPHONE EXTENSION SYSTEM

Filed Nov. 8, 1965 4 Sheets-Sheet 1

INVENTOR
JOEL P. DRIVER
BY Beale and Jones
ATTORNEYS

Jan. 30, 1968 J. P. DRIVER 3,366,880

TONE CONTROLLED WIRELESS TELEPHONE EXTENSION SYSTEM

Filed Nov. 8, 1965 4 Sheets-Sheet 4

United States Patent Office 3,366,880

Patented Jan. 30, 1968

3,366,880

TONE CONTROLLED WIRELESS TELEPHONE EXTENSION SYSTEM

Joel P. Driver, Las Vegas, Nev., assignor to American Telephone Extension Corporation, Las Vegas, Nev., a corporation of Nevada Continuation-in-part of application Ser. No. 272,587, Apr. 12, 1963. This application Nov. 8, 1965, Ser. No. 506,784

21 Claims. (Cl. 325—22)

The present invention relates in general to a communication system for relaying information between two stations and, more particularly, to a system which is adapted to act as a remote telephone extension. This application is a continuation-in-part of my previous application S.N. 272,587, filed Apr. 12, 1963 and now abandoned.

In many circumstances, and particularly in the case of businesses where it is frequently necessary to be in the field and out of the reach of a telephone, it is desirable to establish a wireless contact with a home or office for the purpose of maintaining communication therewith. In such a situation, the advantages of being able to receive incoming and initiate outgoing calls from the field are obvious. Heretofore, it has been difficult to establish such direct contact except through complex and expensive circuitry which made such equipment impractical.

Many attempts have been made, with varying degrees of success, to devise such a system which would be compact, simple of construction, reliable, and easy to operate. The present invention provides such a system. Basically, the present invention provides a base station unit, for inter-connection with a telephone system, and a portable remote unit which acts as a wireless extension telephone. Both units are transceivers, being designed to perform both transmitting and receiving functions. Since both units are capable of both functions, it will be apparent that the units have use not only as telephone extensions, but as general communications relay links as well.

In one embodiment, the base station described herein is used as a relay link between a telephone system and a remote location. The telephone system is coupled to the base station by either a telephone line or an intermediate transmission line, and, when activated by audio or ringing signals, the base station will switch from its normal receive mode to transmit audio and ringing signals by way of a radio frequency (RF) carrier to a remote station. At the end of each transmission, the base station reverts to its receive mode.

The remote transceiver, normally in the receive mode and tuned to the proper RF frequency channel, receives the ringing signal and produces an audible ringing sound. The remote transceiver may be a portable, hand-held unit of low range, or a larger mobile unit with a longer range.

Upon receipt of a ringing signal at the remote station, which may be of the press-to-talk type, or its voice-operated equivalent, the handset is picked up and the talk button pressed to switch the remote unit to the transmit mode. The remote unit is provided with a coding tone oscillator which modulates the transmitted RF carrier at a frequency preferably above the audio range, and may also be provided with a dial mechanism to permit calls to be originated at the remote unit.

Upon receipt of the RF carrier and tone from the remote transceiver, the base station transceiver unit is held in its receive mode and the remote unit is connected to the telephone system through the receiver section of the base station. This effectively answers the telephone from the remote extension. Means are provided to hold the base station in the receive mode in response to and during reception of the tone from the remote unit, thus permitting continued transmission of signals to the telephone system.

Upon release of the talk button at the remote unit, the remote unit switches to receive and releases the base unit, which again is permitted to switch to its transmit mode in response to audio signals from the telephone system. In this manner, two-way conversations may be conducted between a telephone subscriber and the operator of the remote wireless telephone extension.

Not only is the base unit useful as a means for establishing connections between a mobile remote extension and a telephone system, but it also has utility, when combined with a conventional transceiver, as a relay link between a base station and a remote station and thus can extend the range of the system, provide coverage of a normally "dead" area, act as a frequency shifter, or perform any of the tasks normally assigned to radio relay links. In addition, the combination may be used to relay information from a first remote mobile station to a second remote mobile station. When used as a radio relay link in this manner, signals may be received from, e.g., a remote station by the receiver section of the relay unit of the invention, transferred to the standard transceiver and transmitted thereby at a second frequency. Similarly, signals sent from, e.g., a base station may be picked up by the standard transceiver, transferred to the relay unit of the invention, and transmitted thereby at a second frequency.

The system according to the present invention has been found to have particular utility in the range of radio frequencies known as the Citizens Band. However, the tremendous popularity of this frequency band causes a great deal of crowding of the channels, and presents problems in preventing spurious signals from interfering with operation of the telephone extension. In order to overcome such interference and to make telephone calls secure from undesired monitoring, the invention incorporates a coding tone modulation with both the base and remote units being responsive only to carrier waves modulated by coded tone signals having a predetermined characteristic. This enables the subject system to reject signals which do not carry the selected tone, and thus avoid interference. As an additional benefit, the use of such a coded tone modulation makes it possible to operate a number of telephone extension systems on a single carrier frequency channel, each system being sensitive only to a predetermined tone pattern and thus secure from interference from other systems operating on the same channel, but using different tone patterns. The use of this tone coding also makes possible the use of several remote units with a single base unit, or vice versa, the several units using the same code as the base so as to be responsive only to that one base unit. An object of the present invention is, therefore, the provision of a communication system for relaying signals between two stations which, by reason of its use of solid state components, is compact in size, requires small power consumption, is reliable and fast in operation.

Another object of the invention is the provision of a communication system which enables radio coverage to be obtained in dead areas or at distances normally out of range of each other.

A further object of this invention is the provision of a transmission and receiving system for use with an additional transceiver as a wireless radio relay between two remote stations.

It is an object of this invention to provide a communication system for use as an answering extension whereby a telephone may be answered at a location remote from the telephone instrument in response to a signal from a base station and whereby a two-way conversation can be carried on between the telephone system and the remote station.

It is an additional object of the invention to provide a communication system for use as a telephone extension wherein telephone calls can be initiated at the remote station, said remote station being provided with a dial mechanism which may be used to dial any desired telephone subscriber.

Another object of the invention is the provision of a remote telephone answering device linked to a commercial telephone system by a two-way radio system utilizing a push-to-talk or equivalent voice-operated remote unit. The device so provided includes means which permit a two-way conversation to be carried on without interruption by spurious signals which create the impression that the remote unit has terminated the conversation, but which automatically "hangs up" the telephone at the end of the conversation.

It is another object of the invention to provide a communication system which is capable of operating on a shared frequency channel, but which will respond only to predetermined signal sources.

It is a further object of the invention to provide a communication system which includes a coded tone modulation of any predetermined pattern to permit shared-channel operation while maintaining interference-free and secure communication.

Another object of the invention is the provision of a remote telephone extension which is compact and easily portable, but which permits two-way communication with a commercial telephone system through a base station.

A further object of the invention is the provision of a remote telephone extension transceiver having a "push-to-talk" mode of operation or its equivalent and including coding means to permit shared-channel operation, the remote unit being coded so as to be operable only through a predetermined base station.

Additional objects, features and advantages of the invention will be apparent from the following detailed description of a preferred embodiment thereof, selected for purpose of illustration and shown in the accompanying drawings, in which.

Figure 1:
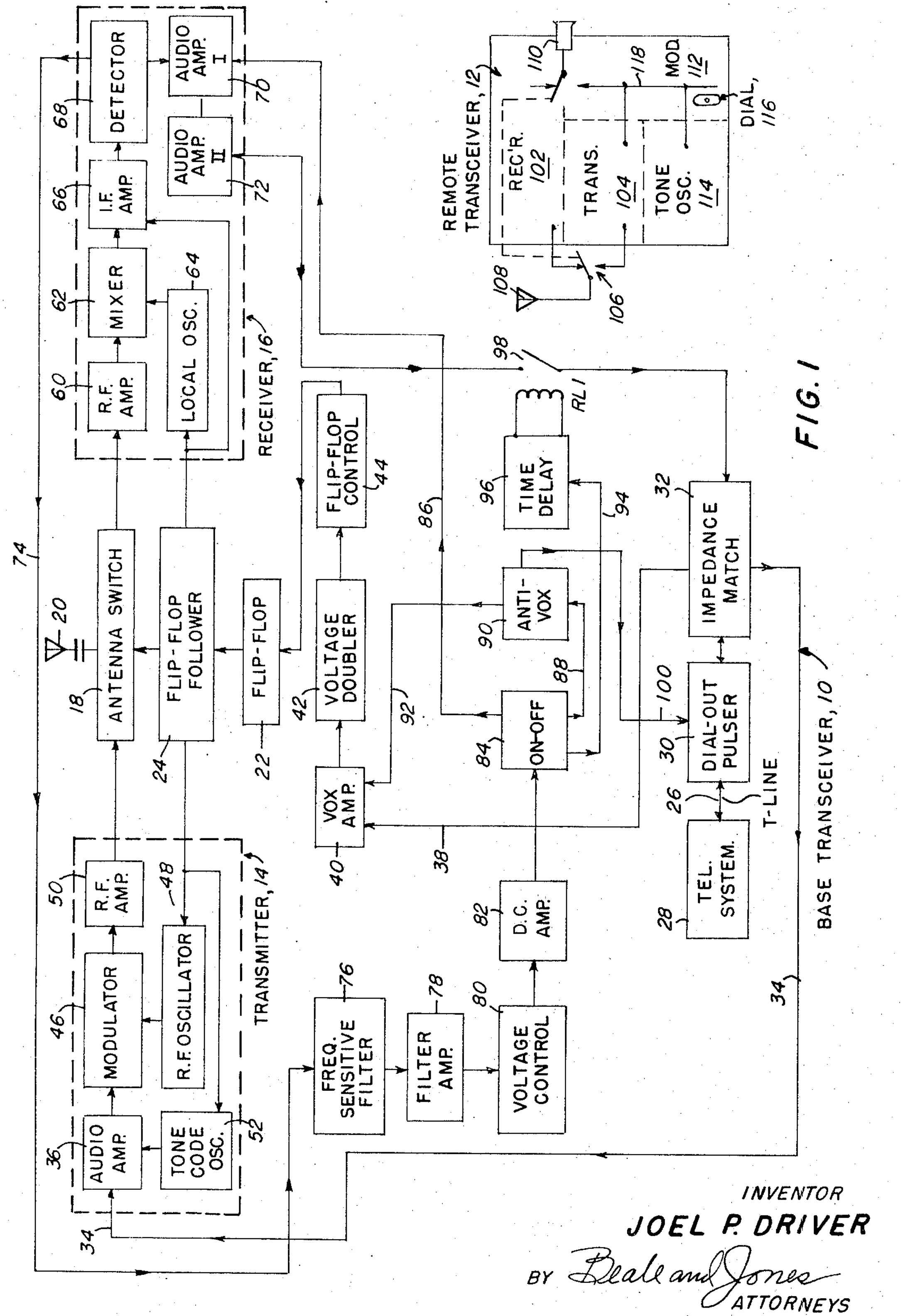
FIG. 1 shows in block diagram form a preferred embodiment of a telephone answering system made in accordance with the present invention.

Referring now to the block diagram of the system in FIG. 1, there is illustrated a communication system providing an answering extension which permits a two-way conversation between a base telephone system and a remote station. Although illustrated as a remote telephone extension system, it will be apparent that the basic circuitry shown in this figure is easily adaptable for use as a radio relay link.

The communication system comprises a base transceiver 10 and a remote transceiver 12. Base transceiver 10 comprises a transmitter 14 and a receiver 16 each connectable through an antenna switch 18 to an antenna 20. The base transceiver 10 is normally in its receive mode, i.e., antenna 20 normally is connected through antenna switch 18 to the receiver 16, but is switchable to the transmit mode under the control of a monostable flip-flop 22 and a flip-flop follower switch 24, the flip-flop

22 being switched to its unstable condition to place the transceiver in its transmit mode. This disconnects receiver 16 and connects antenna 20 through antenna switch 18 to the transmitter 14. The transceiver remains in its transmit mode only as long as there is an audio frequency signal present to hold flip-flop 22 in its unstable condition.

The transceiver is capable of receiving and transmitting radio frequency signals through antenna 20 and receiving and sending out audio frequency signals by way of a transmission line 26. When the system of the invention is used as a telephone extension, the transmission line 26 may be coupled to a commercial telephone system 28, the connection being made through the circuitry of a telephone receiver located at or near the base station. This connection is an electrical coupling, bypassing the telephone receiver handset and permitting direct communication through the telephone receiver circuitry to the telephone system, and thus through the central office of the system to other system subscribers. When the communication system of the invention is used as a relay link, the transmission line 26 of the transceiver may be used to connect transceiver 10 to a second, conventional (i.e., uncoded) transceiver or it may be omitted. In the latter case, the output signal from transceiver 10 which is to be retransmitted is obtained directly from the audio stage of its receiver portion, while the input signal which is received from the second transceiver is applied to the audio input of the transmitter portion of the transceiver 10. In either usage, the radio frequency signals may be directed to and received from a remote transceiver such as the small, hand-held unit 12. Transmission line 26 is shown connected through a dial-out pulser 30, the function of which will be described in detail below, to an impedance matching network 32. Signals applied to the transceiver through transmission line 26 are then fed through line 34 to the audio amplifier 36 of transmitter section 14. These signals are also fed through line 38 to a vox amplifier 40 where they are amplified and fed through a voltage doubler 42 to the flip-flop control 44.

Transmitter 14 is a conventional, preferably transistorized, information-modulated transmitter having, in addition to audio amplifier 36, a modulator 46, RF oscillator 48 and an RF amplifier 50. Also included in the transmitter is a tone code oscillator 52 which superimposes a coding signal of any desired pattern or characteristic on the audio signals applied to audio amplifier 36 for transmission therewith. The oscillator 52 may provide a continuous tone signal of a frequency within the audio range or outside it, or may produce coded pulses of any known type, as, for example, digital pulses in timed relationship with a synchronization signal.

RF signals received by antenna 20 are connected through antenna switch 18 to the receiver section of the transceiver. Receiver 16 is a conventional, preferably transistorized, superheterodyne receiver having an RF amplifier 60, a mixer 62, a local oscillator 64, an IF amplifier stage 66, a first detector 68, and first and second audio amplifiers 70 and 72, all connected in the well-known manner. The first audio amplifier 70 is normally in an off condition and remains in this condition until it is turned on by a control signal obtained in response to the tone coding signals on the input carrier signal. This control signal is derived from detector 68 and is carried by line 74 to a frequency sensitive filter 76. Filter 76 is responsive only to signals of a predetermined code pattern, thus providing the base transceiver with a highly selective response to input signals. The output of filter 76 is amplified in filter amplifier 78 and is converted to a DC voltage in the voltage control circuit 80. The resulting DC voltage is amplified by DC amplifier 82 and passed to the on-off circuit 84. This circuit responds to its input, which may be a continuous or a pulsating DC current, to provide three control signals. The first control signal is applied through line 86 to the first audio amplifier 70 of receiver 16 to turn it on, enabling it to pass audio signals to the second audio amplifier 72. The second control signal is applied through line 88 to an anti-vox circuit 90 which produces a signal on line 92 to disable the vox amplifier 40 and to prevent the transceiver 10 from switching to the transmit mode. This disabling voltage remains on line 92 as long as an input signal which carries the coding signals to which the frequency sensitive filter 76 is responsive is received at antenna 20. The third control signal provided by on-off circuit 84 is fed through line 94 to a time delay circuit 96 which immediately activates a relay RL1 to close its associated contacts 98, completing the circuit from audio amplifier 72 of receiver 16 to the impedance matching circuit 32 and thus to the transmission line 26.

To accommodate the use of a dial mechanism at a remote station such as the remote transceiver 12, the dial-out pulser 30 is provided to interrupt the connection between the impedance matching circuit 32 and the transmission line 26 or to provide touch tone coding for telephone systems adapted for this type of coding. This interruption is in response to and corresponds to a pulsed coding signal received at antenna 20, which signal actuates the on-off circuit 84 and thus the anti-vox circuit 90 to produce a pulsating signal on line 100. This pulsating signal, when applied to the dial-out circuit 30, produces the desired interruption of the connection to effect a dial-out operation.

The remote transceiver 12 includes a receiver section 102 and a transmitter section 104 connectable through a switch 106 to an antenna 108. Switch 106 may be of the push-to-talk type or may be a voice-operated switch. The transceiver 12 includes a speaker-microphone 110 which is normally connected to receiver 102 and acts as a loudspeaker. When the push-to-talk button is depressed, the speaker is connected through a modulator section 112 to the transmitter so that voice transmission can occur in the normal manner. It will be apparent that a separate microphone and loudspeaker can be provided. Superimposed on the audio signal applied to modulator 112 is a coding signal from a coding or tone oscillator 114. A dial mechanism, illustrated schematically at 116 by a rotating cam and normally-closed switch 118, pulses the code signals applied to the modulator 112 to provide the normal dialing signals required by commercial telephone systems. The resulting pulsed tone signal may then be transmitted by the remote transceiver 12 for reception at the base station, where the signal is converted to the type of signal required by the telephone system.

When the base transceiver 10 is connected to a telephone system 28 by means of the T-line 26, a system subscriber wishing to call the telephone to which the transceiver 10 is connected at the base station will dial its number in the usual manner, sending ringing signals through the T-line 26 to the impedance matching circuit 32. The ringing signals pass through the impedance match 32 to vox amplifier 40, voltage doubler 42 and flip-flop control 44. The output of the flip-flop control causes the monostable flip-flop 22 to shift to its unstable state of conduction and, in turn, causes the flip-flop follower 24 to change its state of conduction thereby to turn on transmitter 14 and to connect it to the antenna. The ringing signal on the T-line is also supplied by way of line 34 to audio amplifier 36 and is ultimately transmitted from antenna 20. Modulating the transmitted RF signal is the coded output of the tone oscillator 5 which is combined with the audio frequency signals applied to the transmitter. The tone oscillations may be of any suitable frequency, either in the audio range or above it, and may be a continuous wave oscillation or may be a pulsed signal having a suitable pattern. During any pauses in the signal to be transmitted, and at its completion, the monostable flip-flop 22 automatically reverts to its stable state of conduction. This reconnects the antenna 20 to the RF amplifier 60 of receiver 16 and turns the receiver on by applying a voltage to the local oscillator 64 and the IF amplifier 66. The base transceiver is thus in condition for receiving a signal from remote transceiver 12 during such pauses, allowing the remote unit to control the direction of transmission. Through the use of semiconductor devices in this system, the switching time is very short, allowing the transceiver to switch between its transmit and receive modes even during extremely brief pauses in the input audio frequency signal.

Remote transceiver 12 is normally in the receive mode; any signals sent out by the base transceiver 10 are intercepted by antenna 108 and, if properly coded, are fed through receiver section 102 to the loudspeaker 110. If a ringing signal has been transmitted by the base unit, the output from the loudspeaker will be an audible ringing sound. To answer the telephone, the push-to-talk button on the remote transceiver is pressed, switching the remote transceiver to its transmit mode and causing the loudspeaker to act as a microphone if a single transducer is used. Upon connection of antenna 108 to the transmitter section 104 of the remote unit, a carrier frequency is immediately transmitted. Modulating the carrier signal will be a coding signal from the tone oscillator 114, applied to the transmitter section by way of modulator section 112 and thus combined with any audio signals from microphone 110.

The answering transmission from the remote transceiver 12, which includes an RF carrier signal and a tone oscillation, and which may also include a voice modulation, is received by the base transceiver 10 at the antenna 20. As soon as the base transceiver reverts to its receive mode, as at the end of a ringing signal, the RF input to antenna 20 passes through the antenna switch 18 to RF amplifier 60 in the receiver section. The RF signal is removed in the receiver in the normal manner and the audio output signal due to voice modulation, if any, is applied to the audio amplifier 70. Filter means (not shown) may be provided to separate the coding signals and the audio frequency signals between the detector and amplifier 70. Such a filter would be needed if the coding signals are in the audio frequency range to which telephone systems can respond, i.e., in the range of 250 to 3000 cps. Signals outside that range need not be filtered, for the telephone system will not pass such signals and will thus act as a filter. The audio frequency signals and the tone signals are obtained from detector 68 and applied through line 74 to the frequency sensitive filter 76 which responds only to coding modulations of a predetermined frequency or pattern to provide an output signal. The output signal serves to turn audio amplifier 70 on, to disable vox amplifier 40 and to close contacts 98 in the above-disclosed described manner. As long as the push-to-talk button 106 or its equivalent on the remote transceiver is held down, the base transceiver will remain in its receive mode with the vox amplified disabled, the audio amplifier 70 turned on and relay RL1 energized to hold contacts 98 closed. Contacts 98 effectively "pick-up" the telephone receiver at the base station, so that audio signals can pass into the conventional telephone system. Upon release of the push-to-talk button, the tone signal will be removed from the on-off circuit 84, turning off the anti-vox signal and the audio amplifier 70 to permit the base transceiver to be switched to its transmit mode. By reason of the time delay circuit 96, however, relay contacts 98 remain closed for a suitable length of time, for example, thirty seconds. This delay mechanism holds the telephone in a "picked-up" condition even after transmission from the remote station has stopped, thus avoiding the appearance that the telephone receiver has been hung-up every time the push-to-talk button 106 at the remote unit is released. However, the delay circuit does not hold the base station in its receive mode, but permits it to be switched to its transmit mode under the control of signals from the T-line 26.

By a repetition of the foregoing sequence, a two-way conversation may be carried on between the subscriber at the telephone system 28 and the person answering the remote telephone extension transceiver 12, with the direction of conversation being under control of the remote unit.

As has been mentioned above, the remote unit may be provided with a dial mechanism of a suitable type to permit calls to be initiated from the remote extension. To initiate such a call the push-to-talk button on the remote unit is pressed to place the transceiver in its transmit mode. The RF carrier and the coding modulation are transmitted to the base transceiver, locking it in its receive mode by energizing the anti-vox circuit 90 as described above, and connecting the audio amplifier 72 to the impedance matching circuit 32. The dial mechanism 116 is then operated to open and close contact points 118, modulating the output of the tone oscillator into a series of pulses or providing other suitable signals, as required by the telephone company's central system. These pulses are received by the base transceiver 10 and are applied through the frequency sensitive filter 76 to the on-off circuit 84. These pulses are then fed through line 88, anti-vox 90 and line 100 to the dial-out pulser 30 which responds to each pulse to interrupt the completed DC circuit between audio amplifier 72 and the telephone system. The opening and closing of this circuit places pulses on the T-line and thence into the telephone system. Such pulses are identical to those normally applied to a telephone line by a dial mechanism and thus operate in a similar manner to dial the desired subscriber number. In telephone sytsems which utilize the "touch tone" type of dialing, the dial-out pulser circuit 30 may be modified to provide the type of signal required to effect a dial-out operation.

If the base transceiver 10 is to be used as a communication relay link as, for example, in applications other than telephone extension systems, it will be apparent that only minor modifications need be made. In such a situation, line 26 would be connected to a third but standard transceiver unit such as, for example, a commercially available citizens band mobile transceiver. A tone code oscillator 52 would not be added to the standard transceiver if its bandpass were sufficiently broad to pass the coding signals. Time delay circuit 96 would be modified to eliminate its delay characteristics and relay RL1 would be modified to operate the transmit-receive switch of the standard transceiver. When the transceiver 10 portion of the relay unit is receiving, the coding and audio signals will be transferred through T-line 26 to the standard transceiver and transmitted thereby. Similarly, signals received by the standard unit will be applied through T-line 26 to the transceiver 10 portion of the relay unit and transmitted thereby. The two transceivers will be operating in opposite modes and normally would operate on different frequency channels. If such a relay unit were operating in conjunction with a telephone extension system, intermediate the base unit attached to the telephone system and the remote transceiver 12, the tone coding normally would be passed through the relay link along with the audio frequency signals.

Figure 2:
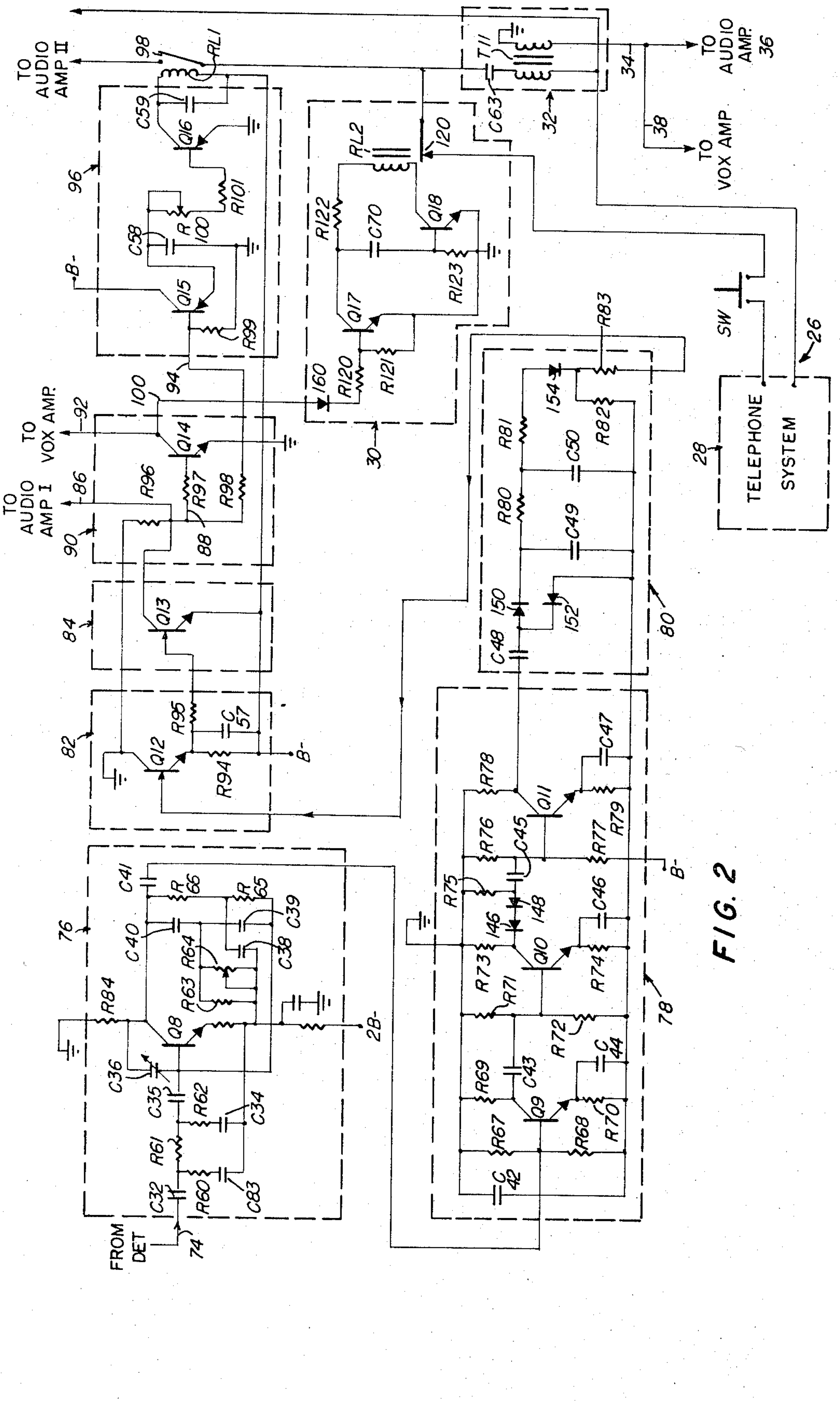
FIG. 2 is a schematic diagram of the circuitry for coupling the system to a telephone system.
Figures 3, 4:
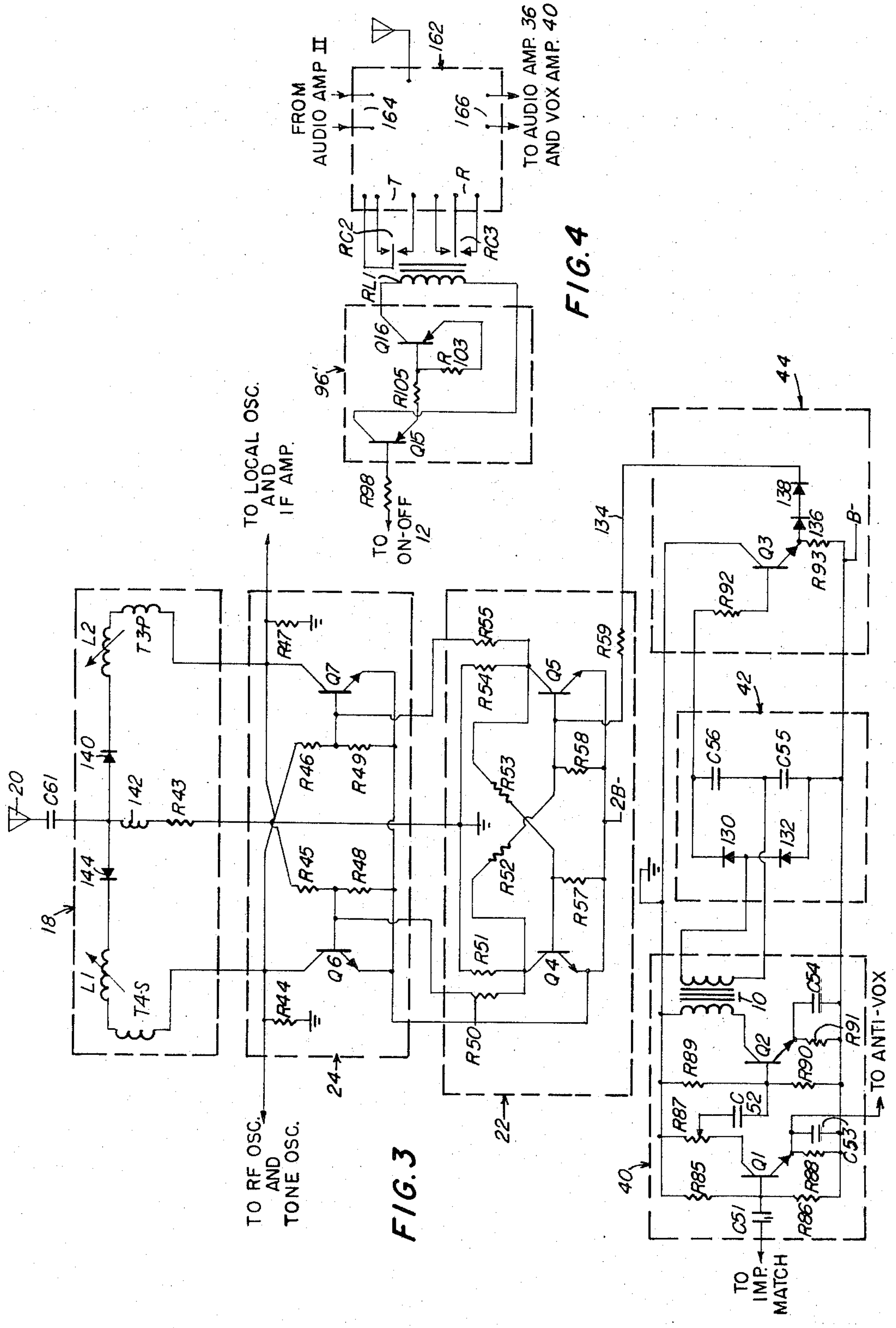
FIG. 3 is a schematic diagram of the antenna control circuitry.
FIG. 4 is a schematic diagram of a modification of the base station unit which permits its operation in a wireless radio relay link.

Turning now to a more detailed description of the circuitry used in a preferred embodiment of the subject system, reference is made to FIGS. 2 and 3 which show the construction of the base transceiver 10.

Again considering the system from the point of view of a signal arriving from telephone system 28 and applied to transmission line 26, such a signal is applied by way of line 26 to the impedance matching circuit 32 through the normally-closed contacts 120 in pulser circuit 30. The impedance match is shown as a transformer T11 having a DC blocking capacitor C63 serially connected with the primary winding and connected across transmission line 26. Capacitor C63 serves to block from T11 the DC voltage that appears on line 26 when connected to a telephone system. The capacitor is of such a value as not to affect the audio frequency signals which are coupled to the secondary winding of transformer T11 and pass by way of line 34 to the audio amplifier 36 of the transmitter 14 and by way of line 38 to vox amplifier 40 (FIG. 3).

A coupling capacitor C51 connects the secondary winding of transformer T11 to the input of vox amplifier 40, i.e., to the base of a transistor Q1. Vox amplifier 40 is comprised of transistor Q1 having bias resistors R85 and R86 connected between the base electrode and ground and between the base electrode and the direct current voltage supply B—, respectively. A bias resistor R88 is connected between the emitter and the voltage supply and is bypassed by a capacitor C53. Variable resistor R87 is connected between the collector of transistor Q1 and ground. The output of transistor Q1 is fed through the tap on variable resistor R87 through a coupling capacitor C52 to the base of a second transistor Q2. Transistor Q2 similarly has a bias resistor 89 connected between the base and ground and a bias resistor R90 connected between base and the voltage supply. A parallel RC network comprising resistor R91 and capacitor C54 is connected between the emitter of transistor Q2 and the supply B—. The collector of Q2 is connected to the primary winding of a coupling transformer T10. Resistance R87 and capacitance C51 are so selected that the signal applied to line 26 will not cause transistor Q2 to conduct unless there is an audio frequency modulation. The modulated signal produced at the base of Q2 is then amplified by transistor Q2 and passed through transformer T10. This signal is rectified by a voltage doubling circuit 42 which is composed of diodes 130 and 132 and capacitors C55 and C56 connected in a well-known manner. The output of this doubling circuit is coupled by resistance R92 to the base of a transistor Q3 in the flip-flop control circuit 44. The collector of transistor Q3 is connected to ground and the emitter is connected through a load resistance R93 to voltage supply B—. Transistor Q3 is, in effect, an emitter-follower switch, which, upon conduction, connects line 134 to ground potential through serially-connected diodes 136 and 138. Line 134 is connected through isolation resistor R59 to the base of the normally non-conductive transistor in flip-flop circuit 22. Diodes 136 and 138 form a single direction current path to limit the conduction of current between the base electrode of the non-conductive transistor in the flip-flop and ground when transistor Q3 is conductive.

Flip-flop 22 is a monostable multivibrator including a normally conductive transistor Q4 and a normally non-conductive transistor Q5 connected in a known manner. The collector electrode of transistor Q4 is connected through resistor R52 to the base of transistor Q5, applying a voltage thereto to maintain it in a non-conductive state. The collector of transistor Q5 is similarly connected through a resistor R53 to the base of transistor Q4. Since Q5 is not conductive, no cut-off voltage is applied to the base of Q4. Bias resistors R57 and R58 are connected between the base of Q4 and the base of Q5, respectively, and the voltage supply 2B—. A load resistor R51 is connected between the collector of Q4 and ground while a resistor R54 is connected between the collector of Q5 and ground. Load resistors R50 and R55 are connected between the collectors of Q4 and Q5, respectively, to their corresponding follower stages in the flip-flop follower 24.

Application of a ground potential to the base of transistor Q5 by means of the conduction of transistor Q3 removes the cut-off voltage from Q5 and permits it to conduct, thus causing a cut-off voltage to appear at the base of Q4. This causes the monostable circuit to begin conducting in its unstable condition, in which state it will remain until transistor Q3 is cut off.

The flip-flop follower 24 consists of a pair of transistors Q6 and Q7 whose states of conduction are opposite to the states of conduction of their respective control transistors. The base of transistor Q6 is connected to the collector of transistor Q4 and thus is normally cutoff. The base of Q7 is connected to the collector of transistor Q5 and thus is normally in a conductive condition. The base of Q6 is connected through resistor R45 to the collector of Q7 and through resistor R48 to a source of bias voltage. Similarly, the base of Q7 is connected through resistor R46 to the collector of Q6 and through resistor R49 to the source of bias voltage. The collectors of the respective transistors in flip-flop follower 24 are connected to the antenna switch 18 to control the connection of antenna 20 to one or the other of transmitter 14 and receiver 16.

The collector of transistor Q7, which is normally conductive, is connected through the primary winding T3–P of the coupling transformer which connects the antenna switch to the receiver 16, through a variable loading coil L2, a diode 140, an isolation coil 142, and a resistor R43 to ground. The flow of current through this path by reason of the conduction of transistor Q7 unblocks diode 140 and permits antenna 20 to be coupled through capacitor C61 and primary winding T3–P to the receiver.

The collector of Q6 is connected through the secondary winding T4–S of the output transformer of transmitter section 14, a variable loading coil L1, a diode 144, coil 142 and resistor R43 to ground. Antenna 20 is connected through capacitor C61 to the junction of back-to-back diodes 144 and 140. The collector of Q6 is also connected across a resistor R44 to the input of RF oscillator 48 and to the input of tone code oscillator 52 in transmitter section 14 to turn on these circuits. Similarly, the collector of transistor Q7 is connected across a resistor R47 to the inputs of the local oscillator 64 and the RF amplifier 66 of receiver section 16 to turn these circuits on.

As has been noted above, transistor Q7 is normally conductive to provide a current path through diode 140 and effectively to connect antenna 20 to the receiver section of the base transceiver. At the same time, the conduction of Q7 applies the supply voltage to the local oscillator and IF amplifier of the receiver section to allow them to operate. When an audio frequency signal such as a ring or voice modulation passes through vox amplifier 40, voltage doubler 42 and causes transistor Q3 of the flip-flop control circuit to become conductive, a ground potential is applied to the base of Q5, as previously described. The conduction of Q5 changes the bias on the base electrode of transistor Q7 and causes it to stop conducting. This cuts off the current path for diode 140 between ground and the supply voltage and also removes the supply voltage from the receiver section circuits. When diode 140 stops conducting, the antenna is disconnected from the receiver and the receiver is turned off.

The switching of flip-flop 22 to its unstable state causes transistor Q4 to stop conducting, changing the bias voltage at the base of follower transistor Q6 and permitting that transistor to start conducting. The conduction of Q6 opens a current path between the bias supply voltage and ground through diode 144, causing diode 144 to conduct and thus to connect antenna 20 to the transmitter section 14. Conduction of transistor Q6 also applies the bias voltage to the oscillator circuits of the transmitter and thus turns the transmitter on. Since the response time of the antenna switch is very short, the audio signal appearing at the transmission line 26 is immediately transmitted with no detectable clipping.

Inasmuch as the flip-flop 22 is of the monostable type and will remain in its unstable condition only so long as a ground potential is applied to the base transistor Q5, the system will remain in the transmit mode only so long as an audio signal is applied to the transmission line. Upon any pause or interruption in the audio signal the flip-flop will revert to its initial condition and will return the system to the receive mode.

Considering now the portion of the base transceiver 10 which is operative during the receive mode, input signals from the antenna 20 are connected through the antenna switch 18 to the receiver 16, as above described. The coding signal and any audio frequency modulations are applied through line 74 to the input of frequency sensitive filter 76 (FIG. 2). The filter network includes a branch, comprising resistors R60, R61, R62 and capacitors C33, C34, and C35 connected in a manner well known in the filter art, having a design and bandwidth sufficient to pass the coding signals, which have a predetermined characteristic. The signal from the detector 68 is applied to this branch, here shown as a high-pass filter designed for tone frequencies above audio, through a capacitor C32 and thence to the base of a transistor Q8. In the illustrated embodiment a special high-gain tone filter comprised of an RC double-T filter with resistors R63, R65, R66 and capacitors C38, C39 and C40 connected in a feed-back arrangement across the collector and base of transistor Q8 in a manner similar to a phase shift oscillator is provided. A variable capacitor C36 is connected in a degenerative feed-back arrangement across the collector and base of Q8 to prevent spurious noise from causing Q8 to oscillate. A variable resistor R64 is connected in parallel with resistor R63 and is adjusted to keep the circuit from oscillating unless a signal of predetermined frequency is applied. A parallel RC network is connected between the emitter and the voltage supply 2B— and a load resistor R84 is connected between the collector of transistor Q8 and ground. By adjusting capacitor C36 so that out-of-phase voltage is fed from the collector to the base of transistor Q8 in a feedback arrangement, the operation of the circuit is stabilized. The twin-T filter provides feedback 180° out-of-phase which, when added to input coding signals of the proper frequency, permits Q8 to oscillate. Thus the filter is so constructed as to amplify the desired frequency and to reject all other frequency signals. It will be apparent, however, that if coding signals having other than tone frequency characteristics are used, the filter network 76 would be modified to provide a suitable response to such signals. The design of such a filter network would depend on the coding signals, and will be apparent to those skilled in the art.

The output of the tone filter 76 is connected through a coupling capacitor C41 to a three-stage filter amplifier 78. The filter amplifier includes three transistors Q9, Q10, and Q11, each having a parallel resistance-capacitance network connected between their respective emitters and the supply voltage B—. These networks are comprised of resistors R70, R74, R79 and capacitors C44, C46 and C47, respectively, for load and bypass purposes. Additionally, each stage includes a bias resistor, illustrated at R68, R72, and R77, respectively, connected between its base electrode and the supply voltage B—. Similarly, bias resistors R67, R71 and R76 are connected between the respective base electrodes and ground. Load resistors R69, R73 and R78 are connected between their respective collectors and ground. A decoupling capacitor C42 is connected across resistor R67 and R68 of the first stage, while a coupling capacitor C43 couples the collector of transistor Q9 to the base of transistor Q10. Between the collector of transistor Q10 and the base of transistor Q11 are two serially-connected clamping diodes 146 and 148 in series with a coupling capacitor C45. A resistor R75 of the same magnitude as resistor R73 is connected between diode 148 and capacitor C45 to ground. Since R73 and R75 both return to ground, R73 is effectively in parallel with the series connection of R75 and diodes 146 and 148. This arrangement establishes a predetermined minimum voltage that must be present on the collector of transistor Q10 before the diodes will become conductive to allow an AC signal to pass to capacitor C45. By adjusting the ratio between R73 and R75, the point at which the diodes conduct may be varied, thus determining the amount of signal that must be present on the collector of C10 before conduction will occur. This permits a predetermined minimum signal to be selected, thereby reducing the response of the circuit to background noise signals, when no signal is being transmitted from the remote station. When diodes 146 and 148 do conduct, they appear to the desired signal as a low resistance path and thus present little or no attenuation of the tone signal.

The output from the filter amplifier 78 obtained at the collector of transistor Q11 is applied to a voltage control circuit 80 comprised of a voltage doubler having capacitors C48, C49 and diodes 150, 152 connected in a well-known manner. Also included in the voltage control circuit is a T-connected circuit consisting of resistors R80, R81 and a capacitor C50. The output of this filter is coupled through a diode 154, and through a stabilization resistor R82 to the supply voltage B—. The output of the voltage control circuit 80 is connected through resistor R83 to the input of a DC amplifier 82, the input comprising the base electrode of a transistor Q12.

Transistor Q12 is connected as an emitter-follower amplifier primarily to provide impedance matching between the voltage control circuit 80 and the on-off circuit 84. The emitter of Q12 is connected through a parallel network including load resistance 94 and bypass capacitance C57 to the voltage supply B—. The collector of transistor Q12 is connected to ground. A coupling resistor R95 connects the emitter of transistor Q12 to the base electrode of the transistor switch Q13 of the on-off circuit 84. The emitter of Q13 is connected directly to the supply voltage B— and its collector is connected through load resistor R96 to ground. The voltage appearing at the base of Q12 is amplified and applied to the base of transistor Q13, switching Q13 to its conductive state and applying the bias supply voltage B— to the input of the audio amplifier 70 by way of line 86. The application of this bias voltage turns the audio amplifier on and allows the audio signal received by antenna 20 to be passed through receiver 22 and to the contacts 98 of relay coil RL1.

The voltage appearing at the collector of transistor Q13 is applied through line 88 to the anti-vox circuit 90 which comprises a transistor switch Q14. This voltage is applied to the base of Q14 through a coupling resistor R97. The emitter of transistor Q14 is connected to ground while the collector is connected to the emitter of transistor Q1 of the vox amplifier 40 by way of line 92. When the voltage produced by the tone signal is applied to the base of transistor Q14, it conducts, and that voltage is applied to Q1 to disable the vox amplifier.

The voltage appearing at the collector of transistor Q13 also is supplied through coupling resistor R98 and line 94 to the time delay circuit 96. This signal is applied to the base of an input gating transistor Q15, the collector of which is connected to the supply voltage B—. The emitter of Q15 is connected through a charging capacitor C58 to ground while the base electrode is connected through a bleeding resistor R99 also to ground. The emitter electrode is connected through a variable resistor R100 and fixed resistor R101 to the base of transistor Q16. The collector of Q16 is connected to the voltage supply B— through the parallel network of filter capacitor C9 and relay coil RL1 while its emitter is connected to ground.

The voltage applied to the base of Q15 through line 94 causes transistor Q15 to become conductive, charging capacitor C58. When the voltage across C58 has built up to a predetermined value, transistor Q16 will conduct, connecting supply voltage B— across coil RL1 and capacitor C59 to cause switch contacts 98 to close. This completes the DC circuit from the output transformer (not shown) of the second audio amplifier 72 of receiver 16 to the transmission line 26. The completion of this DC path effectively (i.e., electronically) picks up the telephone receiver handset at the base station and connects the remote station to telephone system 28. No mechanical lifting of the telephone receiver handset is required to effect this connection, for the base station transceiver 10 may be directly coupled to the telephone receiver circuitry, bypassing the telephone handset. The delay circuit 96 serves to hold the contacts 98 closed even after cessation of incoming signals through the receiver to the on-off switch. During the time that Q15 is conductive, capacitor C58 becomes fully charged so that when Q15 is cut off the charge on C58 will bleed off through variable resistors R100, R101 and transistor Q16 to ground, maintaining Q16 in a conductive state so that current flow through coil RL1 will hold the contacts 98 closed. Q16 will remain conductive for a period of time of adjustable duration, as determined by resistor R100 and the size of capacitor C58. This continued energization of relay coil RL1 maintains the DC path between the second audio amplifier 72 and the telephone system so that the telephone receiver remains electronically picked-up for a period of time after transmission from the remote transceiver has stopped. This eliminates the appearance that the receiver has been hung-up after each transmission by the remote transceiver. It should be noted that the closing of contacts 98 is the only way that the DC circuit for the telephone system can be completed, for capacitor C63 prevents this circuit from being completed through the impedance matching circuit 32. Contacts 98 thus bypass the DC blocking capacitor 63 and permit actuation of the central office relays of the telephone company equipment in the normal manner. It will be apparent that when C58 has discharged sufficiently to cut off Q16, contacts 98 will reopen, thus effectively hanging up the telephone receiver. The time delay is normally sufficient to permit this to occur only at the end of a conversation.

If the transmissions from the remote transceiver have been pulsed by the operation of a dial-out mechanism at the remote station, this pulsed signal will appear at the output terminal of the anti-vox circuit 90 in the form of a pulsed rather than a continuous coding signal, inasmuch as it is the tone signal which is modulated by the dial mechanism. This type of transmission will have the same effect upon the circuitry as above described, holding the base station in its receive mode, but in addition will provide a pulsating signal to the dial-out pulser 30 through line 100. This signal is applied through a coupling diode 160 and a resistor R120 to the base of a normally-off gating transistor Q17 connected in grounded emitter configuration with its collector connected through a resistor R122 to a bias supply. A resistor R121 is connected between the base of Q17 and ground. Q17 turns on at the end of each pulse, and when it becomes conductive a path is provided through its collector-emitter circuit from the source of supply voltage B— to ground. The collector of Q17 is connected through capacitor C70 and resistor R123 to ground, the base of a transistor Q18 being connected to the junction of C70 and R123. By carefully choosing the parameters of C70 and R123, a selected pulse repetition rate will cause Q18 to become conductive, the RC network acting as a resonant amplifier to provide pulses of sufficient amplitude to the base of Q18. Since Q18 only responds to a selected pulse repetition rate, it will not respond to pulses caused by pressing the push-to-talk button at the remote station. The collector of Q18 is connected through a relay coil RL2 to the source of B— voltage providing a current path through RL2 whenever Q18 becomes conductive. Thus, whenever a pulse appears on line 100, Q18 becomes conductive to energize coil RL2 and to open the normally closed relay contacts 120. Q18 conducts only briefly, permitting contacts 120 to close almost immediately, the breaking of the line being of sufficient time duration to permit the telephone company equipment at 28 to respond.

If a person having a remote transceiver 12 with a dial similar to the telephone company dial wished to make a call, he would merely press his transmit button to supply tone coding information to the base station by way of the receiver 16, the frequency sensitive filter 76, the on-off switching circuit 84 and the time delay circuit 96 to close contacts 98 and electrically lift the telephone receiver located at the base station. By holding the transmit button in the transmit position, the anti-vox circuit 90 would prevent the dial tone present in the telephone system 28 from changing the condition of the flip-flop 22 and thus prevent the base transceiver from switching to its transmit mode. When the tone coding oscillator in the remote transceiver is pulsed on and off by means of the dial mechanism, contacts 120 will open and close with each pulse. When open, contacts 120 break both the AC path from the telephone system 28 through impedance matching circuit 32 to the vox amplifier 40 and the DC path to the telephone system dialing equipment. This prevents the dial tone from switching transceiver 10 to the transmit mode, and causes a normal dialing operation to take place. After the first digit has been dialed, the telephone company equipment responds to cut off the dial tone, thus insuring that the transceiver will not switch out of its receive mode. If a busy signal is present on the line, the dialing operation will be ineffective, and at the completion of this operation, the busy signal will come on the line, switching the transceiver 10 to transmit. Although the present embodiment is described with respect to a pulsed dialing operation, the system is easily adaptable for use with any type of signal required by the telephone system 28.

As successive digits are dialed at the remote transceiver 12, relay RL2 will open and close contacts 120 to break and make the DC path to the telephone system automatic dialing equipment until the desired number has been dialed. When the subscriber being called answers his telephone, a two-way conversation may then ensue. After the conversation is terminated the time delay circuit controlling contacts 98 will open the DC path and hang up the telephone receiver, making the system ready to handle another call originating from either the remote transceiver or any subscriber of the telephone system 28.

Before turning to a description of the remote unit, it should be noted that the above-described system may be used as a wireless radio relay between two stations by modifying the time delay network 96 in the manner illustrated in FIG. 4. In this usage, the coupling circuitry of FIG. 2, including the dial-out pulser 30 and the impedance matching network 32 as well as the telephone system connection 28, is replaced by a conventional transceiver 162, and relay RL1 is used to switch this standard transceiver between its transmit and receive modes. The time-delay circuit 96 is modified by removing the charging capacitor C58 and adding a bias resistor R103 between the base of transistor Q16 and ground. Series resistors R100 and R101 are lumped together as resistor R105. Relay coil RL1 is used to operate the contacts RC2 and RC3 which are connected to a transmit-receive switch (not shown) in the transceiver 162 and generally indicated at T and R. The output of the second audio amplifier 72 of the base transceiver 10 is connected to the input terminals 164 which are connected to the audio amplifier stage of the transmitter section (not shown) of the transceiver 162.

Figure 6:
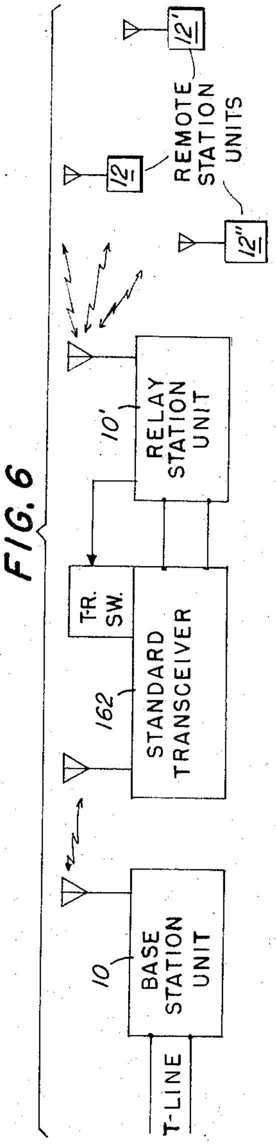
FIG. 6 is a diagrammatic illustration of the use of the present system in a radio relay link.

Output terminals 166 of the audio amplifier stage of the receiver section (not shown) of transceiver 162 are connected to the audio amplifier 36 of transmitter 14 and to the vox amplifier 40 of the base transceiver 10. Thus, when a tone signal is received from a remote station such as a remote transceiver 12, the coil RL1 will be energized to actuate contacts RC2 and RC3 of the standard transceiver 162. This turns on the transmitter section of transceiver 162 and permits transmission by this transceiver of the audio frequency signals received by the base transceiver 10. Similarly, when a signal sent by another remote stations, which may comprise either a base unit similar to transceiver 10 or another remote unit similar to transceiver 12, is picked up by the receiver of transceiver 162, this signal will be transferred to transmitter 14 of base transceiver 10 for transmission thereby. Such a system is illustrated in block diagram form in FIG. 6. As shown there, the relay link comprises the standard transceiver 162 connected as above described to a relay station unit 10′ which is a modified version of the base transceiver 10 shown in FIG. 1 and described above. This relay link may be used to relay signals from a base station unit 10 such as the unit of FIG. 1 connected to a telephone line and a remote station unit 12 such as the hand-held unit illustrated in FIG. 1. It will be apparent that in place of the base station unit 10 shown here a second remote station unit could be used, or that a plurality of remote units 12′, 12″ could be used with a single base station. Further modifications would include the use of a plurality of relay links or the use of a single relay link with the standard transceiver connected to the relay station 10′ through a long transmission line. Of course the tone coding feature would still be available in such a situation, the standard transceiver 162 either being adapted to pass the tone signals transmitted by the base station unit 10 and the remote station unit 12 or being provided with tone oscillators and tone filters, of its own. It will also be apparent that the RF links between the various stations may be of different frequencies, although the use of tone coding in the relay station unit 10′ makes the use of different frequency channels unnecessary.

Figure 5:
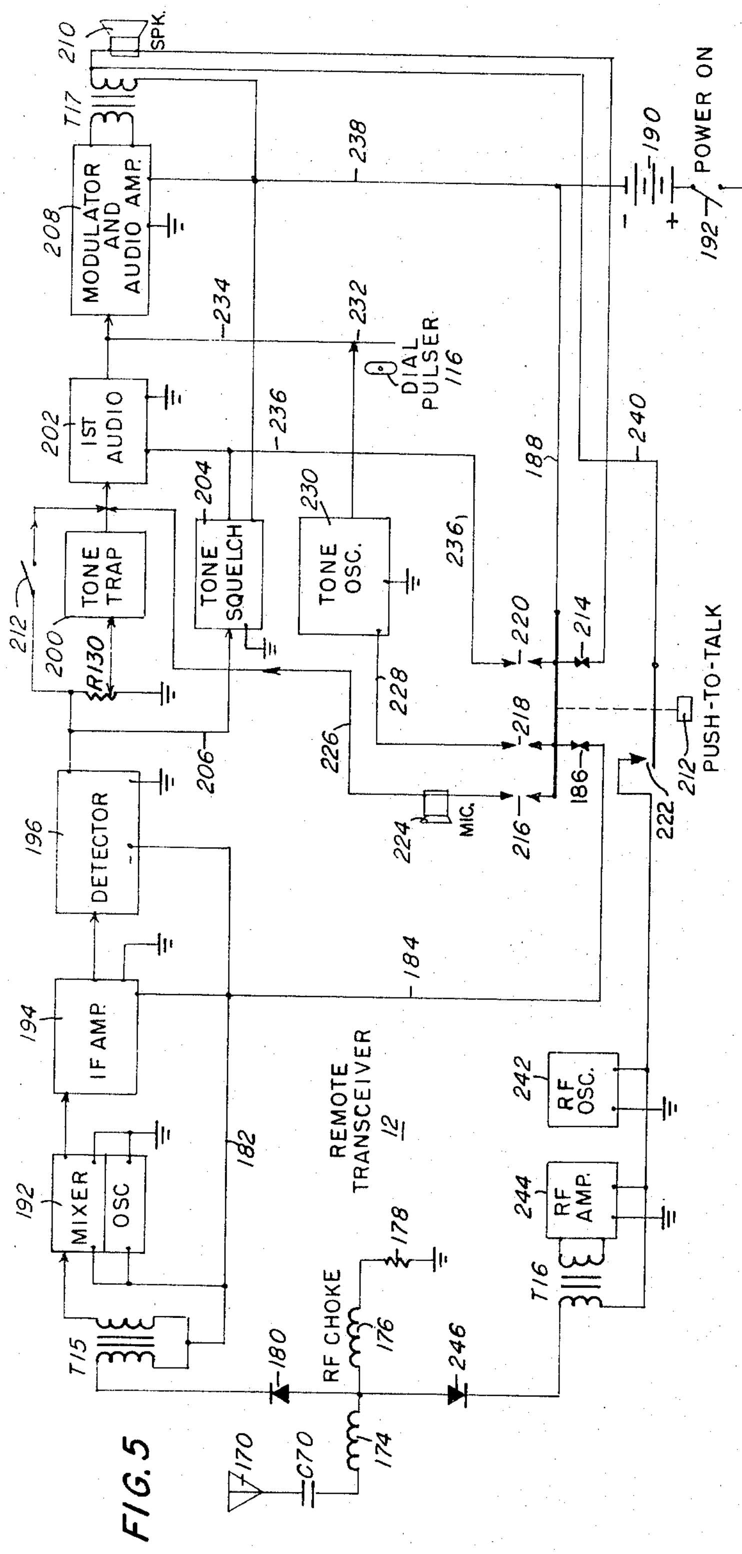
FIG. 5 is a block diagram of a preferred embodiment of a remote telephone answering device made in accordance with the present invention.

Turning now to a more detailed description of the remote station unit 12, there is shown in FIG. 5 a block diagram of a preferred embodiment of such a unit. As has been noted above, the remote station unit is preferably a small, portable hand set.

The remote transceiver 12 includes an antenna 170 connected through a coupling capacitor C70, a loading coil 174, RF choke 176 and current limiting resistor 178 to ground. The junction of coils 174 and 176 is connected through a diode 180, the primary of a coupling transformer T15, line 182, line 184, normally-closed contacts 186 and line 188 to the negative terminal of a supply voltage battery 190. The positive terminal of the battery may be connected through a power on switch 192 to ground. By reason of the fact that contacts 186 are normally closed, a current path is provided through diode 180 between ground and the source of supply voltage, causing diode 180 to conduct and thus to be open to the passage of incoming signals. This establishes a connection between the antenna and transformer T15 to couple the antenna to the receiver portion of the remote transceiver. Thus, the remote unit is normally in the receive mode so that it may respond to any signals transmitted by the base unit.

The receiver section of the remote unit comprises a mixer and local oscillator 192 coupled to the antenna through transformer T15 and connected across its secondary winding. The output of the mixer circuit is passed through IF amplifier 194 and is applied to the input of detector circuit 196. These circuits are conventional and well-known in the art and thus are not shown in detail.

The received signal from the base unit would normally comprise an RF carrier modulated by a tone coding signal and by an audio frequency signal such as a ringing signal or voice modulation. The output of the detector circuit 196 will include the tone signal and the audio frequency modulation. Of course, it will be recognized that the coding signal may also be an audio frequency signal and is not restricted to frequencies out of the audio range.

The output of the detector is fed through a variable volume control resistor R130 to the input of a tone trap 200 which attenuates the tone coding signals and applies the audio frequency signals, either ringing or voice, to the input of the first audio amplified 202. However, the first audio amplifier is normally turned off to prevent undesired signals such as noise or audio signals from another source not coded with the proper tone pattern from activating transceiver 12. To turn the first audio amplifier 202 on, a tone squelch switch 204 responds to the proper injut tone signal to connect the first audio amplifier to its bias supply and thus turn it on. The input for switch 204 is obtained from the output of detector 196 by way of line 206. The tone switch may consist of a highly selective band pass filter of the doube-T type connected between the collector and base of a transistor to provide a highly frequency sensitive oscillator circuit similar to that used in the frequency sensitive filter 76 of the base station. The output of such an oscillator circuit may then be amplified and used to operate a transistor switch in known manner. Thus, only input signals coded with the proper tone frequency will operate the tone squelch switch 204 and turn the first audio on to permit audio frequency signals to pass.

The output of first audio amplifier 202, which amplifier is of conventional construction, is applied to the input of a conventional modulator and audio power amplifier 208 for amplification and application through a coupling transformer T17 to a loud speaker 210.

In order to provide maximum volume for ringing signals received from the base station, a bypass switch 212 is provided which, when closed, bypasses the volume control resistor R130 and the tone trap 200, passing audio frequency and tone signals directly to the input of the first audio amplifier 202. The tone signal turns on the first audio by means of switch 204 in the usual manner and there results a maximum volume signal output from speaker 210, the output combining the ringing signals, the voice signals, if any, and the tone signals. This arrangement insures a maximum ringing signal to attract the attention of the user of the remote transceiver. As a matter of convenience, the bypass switch 212 may be connected to the antenna 170 which may be of the telescoping type, switch 212 being closed when antenna 170 is telescoped to its shortest length, as would be the case when the transceiver is being carried in a pocket or the like.

Upon receipt of a ringing signal, or to respond to a voice signal, the user of the remote transceiver 12 would press the push-to-talk button 212 (or its voice-operated equivalent), opening the normally-closed contacts 186 and 214, disconnecting the supply voltage from the receiver section of the transceiver and from the voice coil of speaker 210, disabling both. Button 212 closes contacts 216, 218, 220 and 222 to switch the remote transceiver to its transmit mode. The closing of contact 216 connects microphone 224 to the source of bias voltage and completes a circuit through line 226 to the input of first audio amplifier 202. The closure of contact 218 applies the bias voltage from battery 190 through line 228 to a tone oscillator 230, turning the oscillator on. The tone oscillator may be of any suitable construction and serves to generate coding signals of the desired frequency and/or pattern. The output of tone oscillator 230 is applied through normally closed contacts 232 and line 234 to the input of the modulator and audio amplifier circuit 208 to combine the coding signal with the audio signals from microphone 224.

Normally-closed contacts 232 are a part of a dial mechanism illustrated diagrammatically at 116. This mechanism is a conventional telephone dial mechanism which serves to open and close contacts 232 in a predetermined pattern in the manner well known in the arts. This mechanism may be used to initiate telephone calls from the remote transceiver by pulsing the tone oscillator output to produce tone pulses in the base station and thus to operate the dial-out pulser 30 (FIG. 1) in the manner previously described. If desired, means may be provided automatically to close the transmit mode switches upon winding of the dial mechanism.

The closure of contacts 220 upon activation of the push-to-talk button 212 applies a bias voltage through line 236 to defeat the tone squelch switch 204 and turn on the first audio amplifier 202. Closure of this switch 212 then permits signals from microphone 224 to pass through the audio amplifier 202 to the modulator 208.

Closure of switch contacts 222 connects the battery 190 through line 238, the secondary of transformer T17 and line 240 to turn on the RF oscillator 242 and the RF amplifier 244 of the transmit section of the remote transceiver 12. This bias voltage is also applied through the secondary of a coupling transformer T16, through a diode 246 connected back-to-back with previously mentioned diode 180, through the RF choke 176 and the current limiting resistor 178 to ground. Closure of this circuit causes diode 246 to conduct, effectively connecting the RF amplifier 242 through transformer T16 to the antenna 170. This completes the transfer of the transceiver from its receive to its transmit mode.

Audio signals from microphone 224 and tone signals from oscillator 230 thus may pass through modulator and audio amplifier circuit 208, transformer T17 and line 240 to modulate the RF carrier signals generated by RF oscillator 242 and amplified by amplifier 244. The modulated RF signals are then transmitted by way of antenna 170. If the transmission from the remote transceiver 12 is in answer to a ringing signal, the transmitted modulation would normally be the tone coding and a voice modulation. On the other hand, if a telephone call is being initiated by the remote transceiver, the transmitted RF signal would be modulated by a pulsed tone oscillation. Of course, upon release of the push-to-talk button 212, the transceiver will immediately revert to its receive mode. This permits a two-way conversation to be carried on with a base station, the remote transceiver controlling the direction of communication.

Since this system is designed to be used on a shared channel basis with many other systems similar to the one described herein as well as other transceiver combinations of standard communication networks, there normally will be several conversations carried on at one time on a single channel. The code toning signal system described herein provides isolation of this system from any other communication using the same channel and will insure that no audio information except that which is supplied by this system will return to the output of the receiver section of the base unit, whether it be connected to a telephone exchange system or to a transmission line. By careful selection of tone frequencies, many systems such as that described herein could share the same RF channel and yet maintain isolation between each other and other communicators using the same channel on a shared-channel basis. Similarly, the use of coding circuitry in the base unit insures that the remote transceiver will hear only the information transmitted by the base station which is modulated by the proper coding pattern. It will be apparent, then, that the number of systems used on a single carrier frequency or channel is limited only by the number of tone frequencies available or by the selectivity of the tone filter used in the system, keeping in mind the physical proximity of the systems and the channels available as well as the possibility of simultaneous use by different subscribers. It will also be apparent that the system is not limited to the use of a single remote transceiver with a single base station unit, but that any practical number of remote transceivers may be used in conjunction with a single base station unit, provided that all are coded through the same frequency or pattern. Similarly, a single remote transceiver could be used in conjunction with a plurality of base station units.

Thus there has been provided a relay communication system having many uses, the foremost of which is its use as a remote telephone extension wherein a telephone may be answered at a location remote from the physical location of the telephone receiver. It will be obvious to those skilled in the art that many modifications and variations utilizing the principles set forth herein may be devised. However, the scope of the invention is not limited to the specific embodiments disclosed herein, but includes the various alternatives and modifications that fall within the true spirit and scope of the invention as defined by the following claims:

I claim:

1. In a remote telephone extension system, a first transceiver having a first transmitter section and a first receiver section; a first antenna; first antenna switch means for selectively connecting said antenna to said transmitter section or said receiver section for operation in a transmit or receive mode, respectively, said first transceiver normally being in its receive mode; impedance matching means electrically coupling said first transmitter section to a telephone system; control circuit means including monostable circuit means responsive to signals from said telephone system to switch said first transceiver to its transmit mode, said monostable circuit reverting to its stable stage and returning said first transceiver to its receive mode during any pauses in said signals from said telephone system; frequency sensitive filter means in circuit with said first receiver and responsive to a received signal of predetermined characteristic for energizing first receive switch means electrically to couple said first receiver section through said impedance matching means to said telephone system without uncoupling said first transmitter section from said telephone system, said frequency sensitive filter means including control circuit disabling means for preventing said first transceiver from switching to its transmit mode during reception of said signal of predetermined characteristic; holding means including a time delay means for maintaining the energization of said first receive switch means for a predetermined period after the end of said signal of predetermined characteristic and thereafter de-energizing said first switch means to uncouple said first receiver section from said telephone system, whereby said first transceiver is adapted to receive incoming calls from said telephone system and transmit said calls as modulations of a radio frequency carrier, and is further adapted to receive modulated radio frequency signals from a remote transmitter, demodulate said signals, and transfer said demodulated signals to said telephone system.

2. The remote telephone extension system of claim 1, further including a second transceiver remote from said first transceiver and having a second transmitter section and a second receiver section; a second antenna; a second antenna switch means for selectively connecting said second antenna to said second transmitter section or said second receiver section for operation in a transmit or receive mode, respectively, said second transceiver normally being in its receive mode and responsive to signals transmitted by said first transceiver; and said second transmitter section including means for continuously modulating by said signal of predetermined characteristic radio frequency signals transmitted by said second transceiver, whereby said remote transceiver can receive and answer calls from said telephone system.

3. The remote telephone extension system of claim 2 wherein said second transceiver further includes dialing means for modulating the signal transmitted to said first transceiver and means in said first transceiver responsive to said dialing modulations for activating the dialing circuits of said telephone system, whereby telephone calls can be initiated by said second transceiver.

4. The remote telephone extension system of claim 2, wherein said first transceiver includes means for generating and transmitting a radio frequency carrier modulated by a signal of said predetermined characteristic, said second transceiver having means for responding to said signal of said predetermined characteristic, said last named means including means for preventing reception of signals not having said predetermined characteristic.

5. The remote telephone extension system of claim 2, wherein said second antenna switching means includes a normally-closed circuit for holding said second transceiver in its receive mode and transmit-receive switch means for opening said normally-closed circuit and closing a normally-open circuit, said normally-closed circuit including a first blocking diode and coupling means for connecting said second antenna to said second receiver section, said normally-open circuit including a second blocking diode and coupling means for connecting said second antenna to said second transmitter section. whereby operation of said transmit-receive switch converts said second transceiver from its receive to its transmit mode.

6. The remote telephone extension system of claim 5, further including a source of direct current connected through said normally-closed circuit to hold said first blocking diode in a state of conduction, whereby radio frequency signals received by said second antenna can pass through said first diode to said second receiver section, said second diode being normally nonconductive to block from second transmitter section the radio frequency signals received by said second antenna, the opening of said normally-closed circuit causing said first diode to become non-conductive and the closing of said normally-open circuit connecting said source of direct current through said second diode, whereby said second diode becomes conductive to pass signals from said second transmitter section to said second antenna, the signals from said second transmitter section being blocked from said second receiver section by said first diode.

7. The remote telephone extension system of claim 4, wherein said means in said second transceiver for responding to said signal of said predetermied characteristic includes filter means for separating said last-named signal from any other signals carried by said radio frequency carrier and for applying said other signals to a normally-off audio amplifier, squelch means responsive only to said signal of said predetermined characteristic to turn on said audio amplifier whereby said other signals may be amplified, and an output transducer for converting said other signals to sound waves.

8. The remote telephone extension system of claim 7, wherein said second receiver section further includes volume control means and bypass switch means for bypassing said volume control and said filter means, whereby said signal of said predetermined characteristic and said other signals may be applied through said audio amplifier to said output transducer at maximum amplitude.

9. The remote telephone extension system of claim 7, wherein said second transmitter section further includes a transducer for converting sound waves to audio frequency electrical signals, means operative during the transmit mode of said second transceiver for turning on said normally-off audio amplifier, and means for applying said audio frequency electrical signals through said audio amplifier to modulator means, whereby said audio frequency signals modulate said radio frequency carrier transmitted by said second transceiver.

10. The remote telephone extension system of claim 7, wherein said second transceiver is normally on to monitor incoming calls, said second transceiver including attenuator volume control means for controlling the amplification of said other signals, said second antenna being retractable, bypass switch means operable by said second antenna and being closed when said second antenna is retracted to bypass said volume control means, whereby the full amplitude of said other signals is applied to said output transducer.

11. The remote telephone extension system of claim 2, wherein said means in said second transmitter section for continuously modulating radio frequency signals transmitted by said second transceiver includes generator means for producing said signal of a predetermined characteristic, modulator means for modulating said radio frequency carrier with said signal of a predetermined characteristic, and means for applying said modulated radio frequency carrier to said second antenna for transmission; said second transceiver further including dialing means for selectively interrupting said signal of said predetermined characteristic to produce a dialing modulation of said radio frequency carrier; and means in said first transceiver responsive to said dialing modulation for activating the dialing circuits of said telephone system, whereby communication between subscribers of said telephone system and said second transceiver can be initiated at said second transceiver.

12. The remote telephone extension system of claim 11, wherein said means in said first transceiver responsive to said dialing modulation includes dial-out pulser means interposed between the output of said receiver section and said telephone system, said pulser means being adapted to respond to said selective interruptions in said signal of predetermined characteristic to correspondingly interrupt said connection between said first receiver section and said telephone system without deenergizing said first receive switch means, whereby the dialing circuits of said telephone system are activated.

13. The remote telephone extension system of claim 1, wherein said first receiver section includes detector means, the output of said detector means being applied to a normally-off audio amplifier and to a filter network in said frequency sensitive filter means, said filter network responding to a signal of said predetermined characteristic to produce an output, said frequency sensitive filter means further including on-off switching means responsive to an output from said filter network to turn said audio amplifier on and to disable said control circuit means to hold said monostable circuit in its stable state whereby said first transceiver is maintained in its receive mode for the duration of reception of said signal of predetermined characteristic.

14. The remote telephone extension system of claim 13, wherein said holding means is responsive to the output of said frequency sensitive filter means to energize said first receive switch means to connect the output of said audio amplifier through said impedance matching means to said telephone system, whereby audio frequency signals received by said first transceiver are transferred to said telephone system, said time delay means maintaining the connection between said audio amplifier and said telephone system for a predetermined time after the output from said filter means is cut off.

15. The remote telephone extension system of claim 1, said first transceiver further including dial-out pulser means interposed between the output of said first receiver section and said telephone system and adapted to respond to predetermined modulations of the output from said frequency sensitive filter means to interrupt said connection between said first receiver section and said telephone system in accordance with said predetermined modulations, without deenergizing said first receive switch means, whereby the dialing circuits of said telephone system are activated to effect a dial-out operation.

16. The remote telephone extension system of claim 1, wherein said control circuit means further includes normally-off vox circuit means for controlling the state of conduction of said monostable circuit, said signals from said telephone system turning on said vox circuit means to cause said monostable circuit to assume an unstable state of conduction thereby to disable said first receiver section and to connect said first transmitter section to said first antenna, pauses in said signals from said telephone system permitting said vox circuit means to return to its normally-off condition, whereby said monostable circuit reverts to its stable state, thereby to disable said first transmitter section and to connect said first receiver section to said first antenna.

17. The remote telephone extension system of claim 16, wherein said first antenna switch means includes third and fourth blocking diodes connected back-to-back, said first antenna being connected to the junction of said diodes, said third diode being connected through receiver section coupling means to said monostable circuit, whereby conduction of said monostable circuit in its stable state unblocks said third diode and couples said first antenna to said first receiver section; said fourth diode being connected through transmitter section coupling means to said monostable circuit, whereby conduction of said monostable circuit in its unstable state unblocks said fourth diode and couples said first antenna to said first transmitter section.

18. The remote telephone extension system of claim 16, wherein said control circuit disabling means includes anti-vox circuit means in said frequency sensitive filter means, said anti-vox circuit means being energized during the reception of said signal of predetermined characteristic to hold said vox circuit in its normally-off condition, whereby said signals from said telephone system cannot turn said vox circuit means on during the reception of said signal of predetermined characteristic.

19. The remote telephone extension of claim 1, wherein said frequency sensitive filter means includes a filter network responsive only to said signal of said predetermined characteristic, whereby said first transceiver will receive radio frequency signals from a remote transceiver only when such radio frequency signals are modulated by said signal of said predetermined characteristic.

20. The remote telephone extension system of claim 4, wherein said first and second transceivers operate on a single frequency channel for wireless contact with each other, said signal of said predetermined characteristic being a tone coded signal whereby transmissions by either of said transceivers will be secure from reception by other similar systems having different frequency sensitive filter means, and whereby said first and second transceivers will not respond to radio frequency signals on said single frequency channel but not modulated by said signal of said predetermined characteristic.

21. In a communications receiver having a retractable antenna, said receiver being normally on to monitor incoming calls, a detector stage for separating RF carrier signals from audio frequency signals, an audio stage for amplifying said audio frequency signals for application to a loudspeaker means, attenuator volume control means for said audio frequency signals, and bypass switch means operable by said antenna, said bypass switch being closed when said antenna is retracted to bypass said volume control, whereby the full amplitude of said audio frequency signals is applied to said loudspeaker means.

References Cited

UNITED STATES PATENTS

| | | | |
|---|---|---|---|
| 2,442,815 | 6/1948 | Kelley | 325—5 X |
| 2,571,031 | 10/1951 | Hansell | 325—392 X |
| 2,875,330 | 2/1959 | Padgett et al. | 325—312 |
| 2,935,605 | 5/1960 | Mathieu | 325—64 X |
| 2,935,606 | 5/1960 | Harrison et al. | 325—16 |
| 2,974,221 | 3/1961 | Peth | 325—55 X |
| 3,037,114 | 5/1962 | Bier et al. | 325—370 |
| 3,065,421 | 11/1962 | Hart | 325—55 |
| 3,183,373 | 5/1965 | Sakurai | 307—88.5 |
| 3,198,888 | 8/1965 | Lemelson | 179—41 |
| 3,233,109 | 2/1966 | Byles et al. | 325—406 X |
| 3,240,879 | 3/1966 | Bryant | 179—41 |

JOHN W. CALDWELL, *Primary Examiner.*

DAVID G. REDINBAUGH, *Examiner.*

B. V. SAFOUREK, *Assistant Examiner.*